United States Patent
Liao

(10) Patent No.: US 6,270,438 B1
(45) Date of Patent: Aug. 7, 2001

(54) COMBINATION DRIVING HUB FOR BICYCLE

(76) Inventor: Yuan-Cheng Liao, No. 6, Alley 24, Lane 1651, Chun-Jih Rd., Taoyuan City (TW)

( * ) Notice: Subject to any disclaimer, the term of this patent is extended or adjusted under 35 U.S.C. 154(b) by 0 days.

(21) Appl. No.: 09/469,610

(22) Filed: Dec. 22, 1999

(51) Int. Cl.$^7$ .......................... B62M 11/16; B62M 23/02
(52) U.S. Cl. ................................................. 475/4; 180/207
(58) Field of Search .................................. 475/3, 4, 230; 180/205, 207, 65.2

(56) References Cited

U.S. PATENT DOCUMENTS

| | | | |
|---|---|---|---|
| 713,467 | * 11/1902 | MacDonald | 475/4 |
| 5,836,414 | * 11/1998 | Seto et al. | 180/207 |
| 5,914,333 | * 8/1999 | Sun et al. | 180/206 |
| 6,080,073 | * 6/2000 | Liu et al | 475/4 |

FOREIGN PATENT DOCUMENTS

| | | |
|---|---|---|
| 265286 | * 3/1950 | (CH) . |
| 7-267173 | * 10/1995 | (JP) . |
| 8-099682 | * 4/1996 | (JP) . |
| 8-169384 | * 7/1996 | (JP) . |
| 9-066883 | * 3/1997 | (JP) . |
| 9-142370 | * 6/1997 | (JP) . |
| 10-138986 | * 5/1998 | (JP) . |

* cited by examiner

Primary Examiner—Richard M. Lorence
Assistant Examiner—Ankur Parekh
(74) Attorney, Agent, or Firm—Fei-Fei Chao; Venable, Baetjer, Howard & Civiletti, LLP

(57) ABSTRACT

The invention discloses a combination driving hub for a bicycle. The hub has a pair of cups mating together at end faces thereof thus forming a housing. A central opening is defined in each cup through both of which a spindle having a first and a second end is inserted. A first and a second tube fitted respectively the first end and the second end of the spindle, are inserted in the two central openings. A freewheel gear is securely affixed on the second end of the second tube, and a driving means is provided between the first tube and an electric motor to drive the first tube. By increasing a rotational speed of either the first or the second driving bevel gear, a rotational speed of the hub will be increased by a half of this increase. Additionally, when a greater force is needed during riding, it will be obtained by adding electric motor force to the pedaling, or vice versa.

7 Claims, 3 Drawing Sheets

COMBINATION DRIVING HUB FOR BICYCLE

BACKGROUND OF THE INVENTION

1. Field of the Invention

The invention relates to a combination driving hub for bicycle, especially to the hub being able to be driven by a combination force of a motor and a bicycle rider.

2. Description of Related Art

In some countries bicycles are more used as vehicles than as a sporting utility. A large number of people often use bicycles in daily life. Recently a kind of electric motor bicycle has been developed to help bicycle riders to save their labor. However, this kind of electric motor bicycle can only be propelled by either an electric motor or by pedaling of the rider. If the electric motor and the foot power are employed simultaneously, force from the pedaling may destroy a driving system of the electric motor. Therefore, when a larger force, for example in climbing a slope, or a greater speed is needed, which could be obtained by a combined propulsion of the electric motor and pedaling, it will be beyond the above conventional electric motor bicycle.

SUMMARY OF THE INVENTION

The main objective of the invention is to provide a combination driving hub for a bicycle which can be driven simultaneously by both an electric motor and pedaling of a rider whereby a relatively larger force and a greater speed can be obtained.

Other objects, advantages and novel features of the invention will become more apparent from the following detailed description when taken in conjunction with the accompanying drawings.

DETAILED DESCRIPTION OF THE PREFERRED EMBODIMENT

Figure 1:
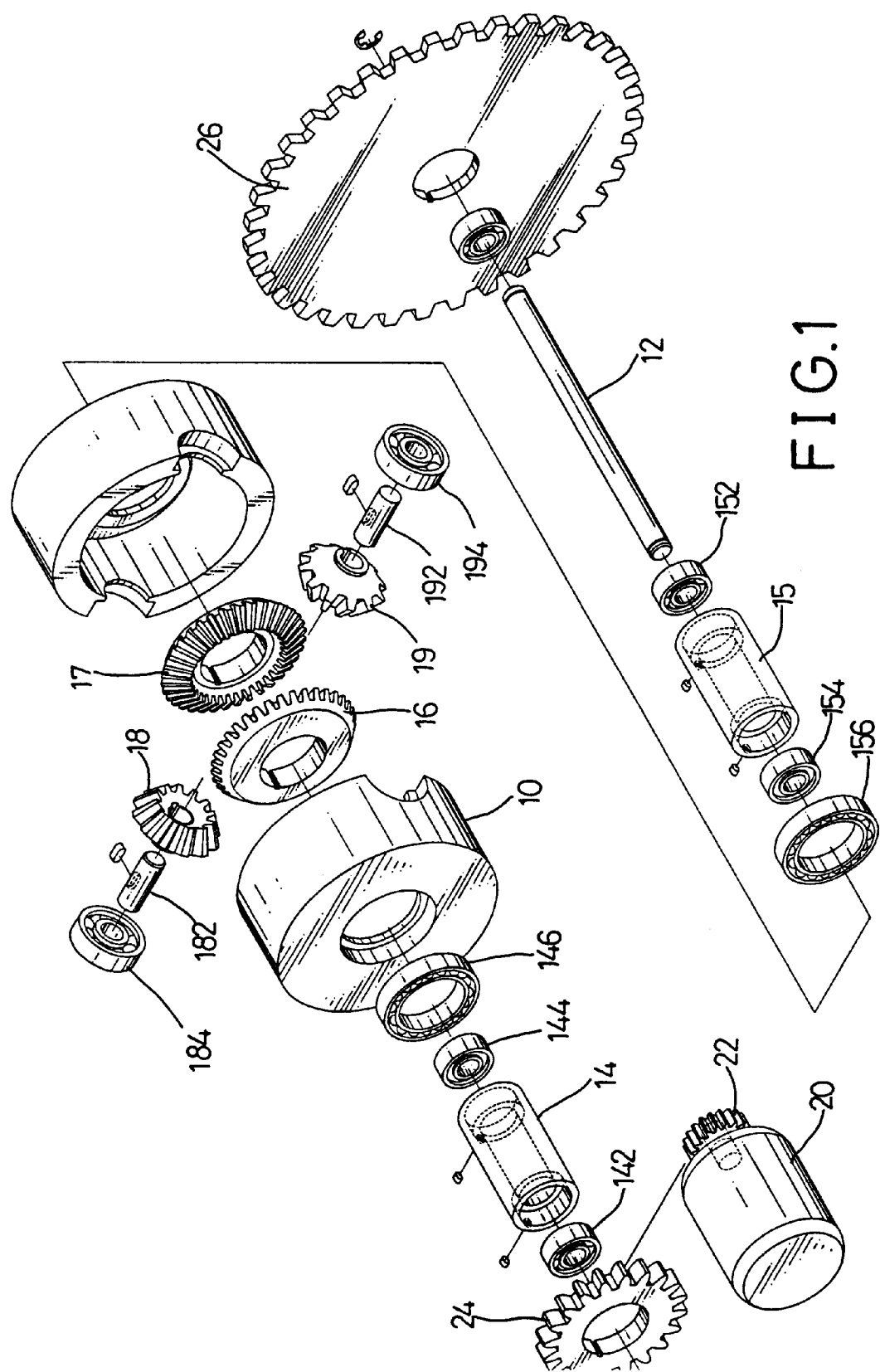
FIG. 1 is a perspective exploded view of the invention.
Figure 2:
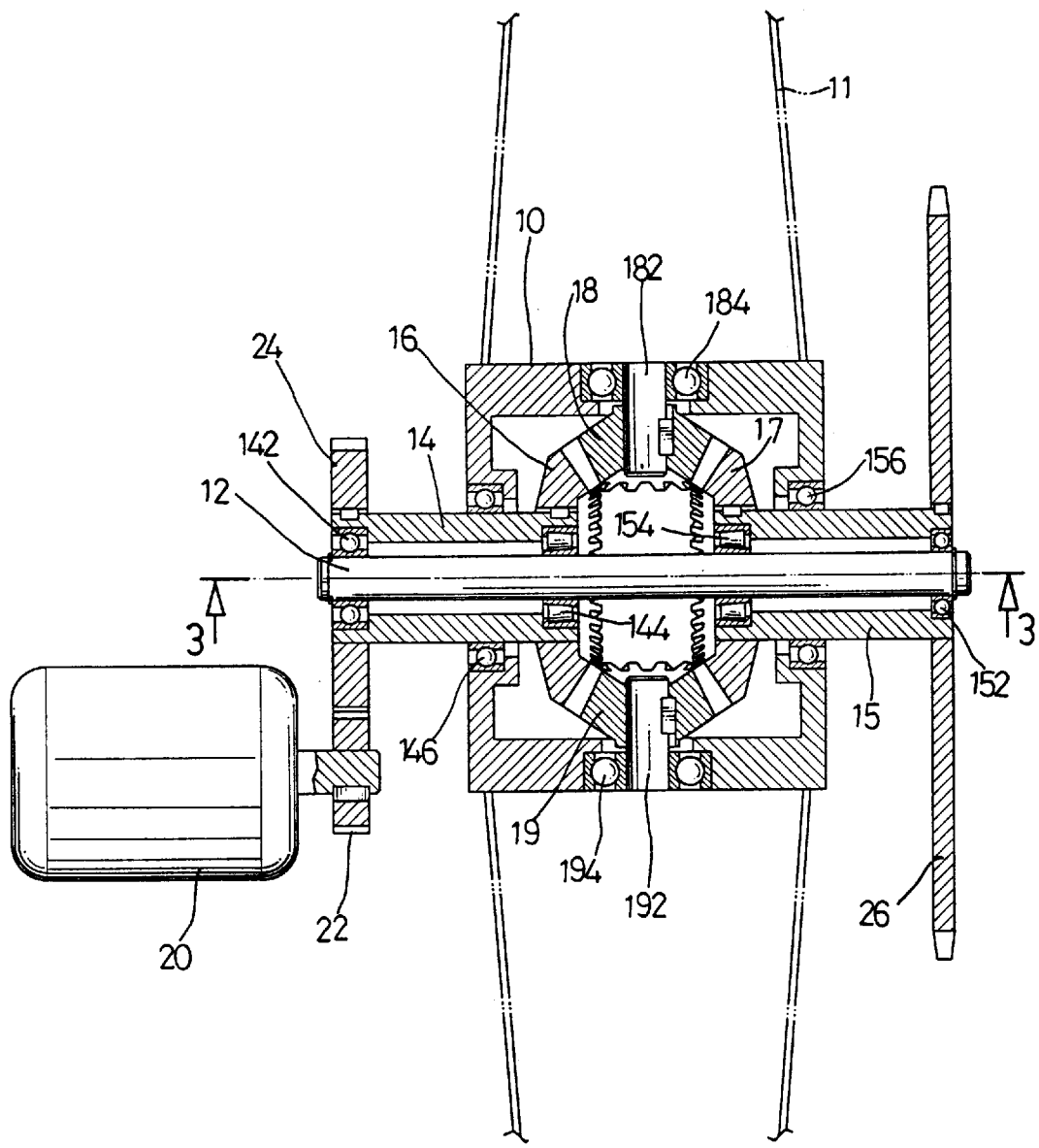
FIG. 2 is a cross-sectional view of the invention.
Figure 3:
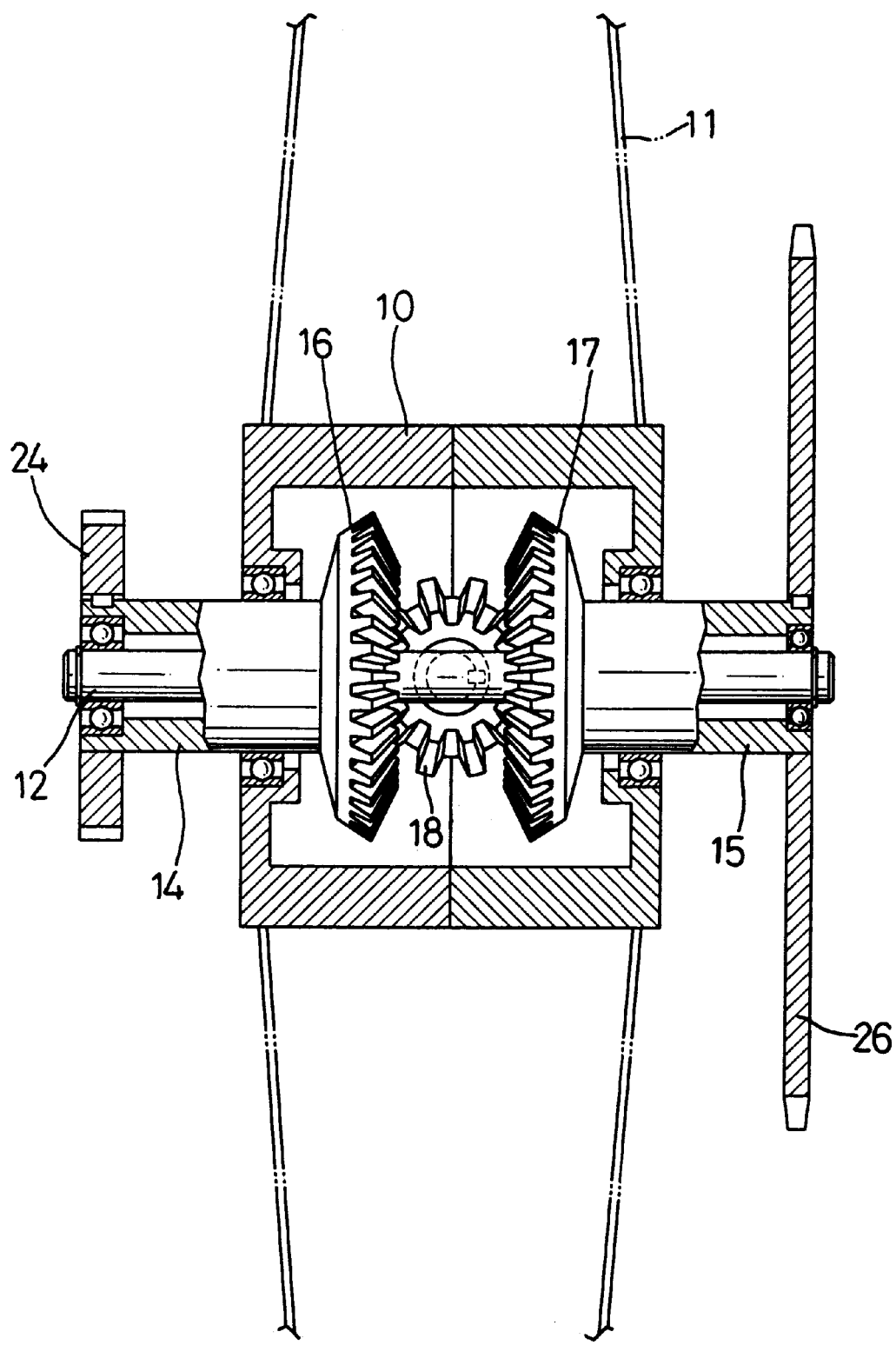
FIG. 3 is a partially cross-sectional view of the invention.

FIGS. 1, 2, and 3 show the invention, a combination driving hub (10) for a bicycle.

The hub (10) includes two identical cups each with a bottom wall, a flange perpendicularly extending from the bottom wall, and a recess defined within the flange. Each flange has a distal end face which mates with the other whereby the combined cups form a housing. The cups can be securely combined in a variety of ways, such as welding, brazing etc. A plurality of spokes (11) is securely attached to and extends from each cup to further be secured to a rim (not shown) like a convention bicycle wheel. Although spokes are chosen in this embodiment, other methods of securing the hub (10) to the rim are commonly found in this field and will not be described in detail here.

The bottom wall of each cup defines a central opening in communication with the respective recess and each of which securely contains a bearing (146, 156) therein the function of which will be described hereinafter. A first pipe and a second pipe (14, 15) are respectively inserted in the bearings (146, 156) with one end of each pipe (14, 15) being received in the central openings and recesses of the housing and a free end of each pipe (14, 15) protrudes from a respective one of the bottom walls. The two pipes (14, 15) are able to rotate with respect to the housing. A pair of bearings (142, 144) is installed in the first pipe (14) and a pair of bearings (152, 154) is installed in the second pipe (15), with an outer tube of each bearing (142, 144, 152, 154) being affixed by at least one pin with respect to the pipes 14, 15). At least one of each pair of bearings (142,144; 152,154) is a single direction bearing. On the end of each pipe (14, 15) extending into the recesses of the housing, a driving bevel gear (16, 17) is securely affixed. A spindle (12) is inserted through the aforementioned bearings (142, 144, 152, 154) and has two distal ends which are clamped in a conventional manner to a frame of the bicycle. At least one, and in this embodiment, two driven bevel gears (18, 19) are installed in the housing by means of two axles (182, 192) respectively inserted in two bearings (184, 194) securely affixed in the two openings of the cups. The driven bevel gears (18, 19) engage with aforementioned two driving bevel gears (16, 17), as clearly shown in FIGS. 2, and 3.

A driving means is provided between the first tube (14) and an electric motor (20), whereby the first tube (14) is able to be driven by the electric motor (20) which is attached to the frame of the bicycle and controlled in a conventional manner. In this embodiment, the free end of the first pipe (14) has a gear (24) securely installed thereon which engages with a motor gear (22) securely installed on a shaft of the electric motor (20). In a second embodiment, the driving means could be a belt or a chain. The free end of the second pipe (15) has a freewheel gear (26) of the bicycle securely affixed thereon.

When the bicycle is being ridden, the electric motor (20) can drive the first tube (14) via gears (22, 24) and thus the first driving bevel gear (16); and simultaneously, the rider can pedal the bicycle. The rotation of a chainwheel caused by the pedaling can drive the freewheel gear (26) via a chain, then the second pipe (15) and the second driving bevel gear (17) securely affixed on the second pipe (15).

According to gear driving theory, the revolution rotational speed of the driven bevel gears (18, 19) round the first and the second driving bevel gears (16, 17) is equal to a half of the sum of the rotational speed of the first driving bevel gear (16) and that of the second driving bevel gear (17). This revolution rotational speed of the driven bevel gears (18, 19) is a rotational speed of the hub (10). Therefore, by increasing the rotational speed of either the first or the second driving bevel gear (16, 17), the rotational speed of the hub (10) will be increased by a half of this increase. Additionally, when a greater force is needed in a riding, it will be obtained by adding electric motor force to the power of the pedaling, or vice versa.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A combination driving hub (10) for a bicycle having a housing with securing means extending outward therefrom to a rim, wherein the improvements comprising:

a pair of central openings defined in the housing, a spindle (12) with a first side and a second side, and extending through the pair of central openings, a first tube (14) fitted to the first side of the spindle (12) and having a first pair of bearings (142, 144) fitted in the first tube (14) and through which the spindle (12) is inserted, with at least one of the first pair of bearings being a single direction bearing, the first tube (14) being able to rotate about the spindle (12), with a first end thereof inserted in the housing and a second end protruding from the housing, a second tube (15) fitted to the second side of the spindle (12) and having a second pair of bearings (152, 154) fitted in the second tube (15), and through which the spindle is inserted with at least one of the second pair of bearings(152,154) being a single direction bearing, the second tube (15) being able to rotate about the spindle (12), with a first end thereof inserted in the housing and a second end protruding from the housing, a first driving bevel gear (14) securely affixed on the first end of the first tube (14), a second driving bevel gear (15) securely affixed on the first end of the second tube (15), a driven bevel gear (18) installed in the housing by means of an axle (182) securely inserted in a bearing (184) securely affixed in an opening defined in a periphery of the housing, and engaging with said two driving bevel gears (16, 17), a freewheel gear (26) securely affixed on the second end of the second tube (15), a driving means provided between the first tube (14) and an electric motor, and driving the first tube (14) via the electric motor.

2. The combination driving hub for a bicycle as claimed in claim 1, wherein the first and the second tubes (14, 15) are respectively fitted to the hub (10) by means of a bearing (146, 156) installed in the central openings.

3. The combination driving hub for a bicycle as claimed in claim 1, wherein the driving means is a gear (24) affixed on the second end of the first tube (14), and a motor gear (22) engages therewith.

4. The combination driving hub for a bicycle as claimed in claim 1, wherein the driving means is a belt.

5. The combination driving hub for a bicycle as claimed in claim 1, wherein the driving means is a chain.

6. The combination driving hub for a bicycle as claimed in claim 1, wherein the amount of the driven bevel gear is more than one.

7. The combination driving hub for a bicycle as claimed in claim 1, wherein the housing comprises a pair of cups.

* * * * *